Patented Oct. 30, 1928.

1,689,775

UNITED STATES PATENT OFFICE.

WALLACE L. CHANDLER, OF EAST LANSING, MICHIGAN.

CALCICATED IODINE AND PROCESS OF PREPARING SAME.

No Drawing.   Application filed May 1, 1924. Serial No. 710,420.

This invention relates to an improved calcicated iodine and the process of preparing the same. The material I call calcicated iodine.

The main objects of the invention are:

First, to provide an improved stable iodine compound or a composition or mixture of compounds capable of disintegrating under the effects of weak acids to produce free active iodine in solution at the points of application of medication, and the process of producing the same.

Second, to provide an improved stable calcicated iodine compound or a composition or mixture of compounds in aqueous solution capable of yielding, under the effects of strong acids, the right concentrations and proportions of hydriodic acid and iodic acid in solution so that the latter will immediately yield sufficient oxygen to vigorously and completely oxidize all of the hydriodic acid in solution and that formed as the result of the disintegration of the iodic acid, precipitating a water-soluble crystalline form of iodine. This has the properties described in my copending patent application filed March 16, 1923, Serial No. 625,670.

Objects pertaining to the details of the process of preparation will definitely appear from the description to follow.

I accomplish the objects as pointed out in the following specification. The invention is clearly defined in the claims.

In carrying out my invention I place a quantity of sublimed iodine (an excess of that required for the reactions) into a glass, earthware or wooden container, such for instance as a wooden barrel, and then fill the container with a saturated aqueous solution of calcium hydroxide. The calcium hydroxide is obtained by treating "building lime" with a large quantity of water, allowing the undissolved particles to settle and removing the clear supernatant fluid, by drawing it off or otherwise. The contents of the container are agitated at intervals in order to insure a complete reaction between the calcium hydroxide and the iodine, until the fluid takes on a permanent red-wine color. The agitation insures the excess of iodine.

This fluid then consists of a mixture or composition of the compounds: calcium iodide (five parts) and calcium iodate (one part) with iodine in solution in these salts. The total iodine content, in combination and in solution, is from .7% to 1.2%. The strength depends on the strength of the hydroxide used. The stronger is produced when there is a small amount of calcium hydroxide in suspension. This solution may be slightly cloudy from the small amount in suspension, such slight cloudiness being permissible. Iodine in excess is required for a continuous process.

The probable main reactions are as follows:

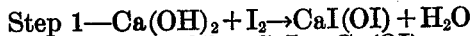
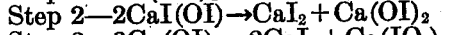
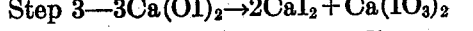

Step 1—$Ca(OH)_2 + I_2 \rightarrow CaI(OI) + H_2O$
Step 2—$2CaI(OI) \rightarrow CaI_2 + Ca(OI)_2$
Step 3—$3Ca(OI)_2 \rightarrow 2CaI_2 + Ca(IO_3)_2$ Thus, leaving out the intermediate steps which are quite transient, we have:

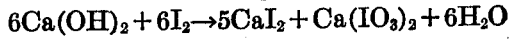

$6Ca(OH)_2 + 6I_2 \rightarrow 5CaI_2 + Ca(IO_3)_2 + 6H_2O$

If the fluid is allowed to remain in the container, in the presence of iodine crystals, after the above reactions have been completed, some iodine will go into solution in the salts formed; but this fact in no way injures the chemical properties of the product.

My improved composition calcicated iodine has the following properties: It is a colorless, oderless (except that at times it has a faint "iodoform" oder) liquid with a slightly alkaline reaction and consists of approximately five parts of calcium iodide and one part calcium iodate in solution.

Upon acidification with a strong acid, such as sulfuric acid, a crystalline form of iodine is precipitated.

The object of treating crystalline iodine with the clear, or at best but slightly cloudy, solution of lime instead of with the milk of lime or moistened lime, as are the ordinary practices in the preparation of "iodated lime", is that, since calcium iodate is but sparingly soluble in concentrated solutions of calcium iodide, in the ordinary processes the calcium iodide is so highly concentrated that the calcium iodate formed precipitates in the form of hexahydrated calcium iodate, and there does not remain in solution a sufficient amount of monohydrated calcium iodate to yield, on acidification with a strong acid, the required amount of oxygen to complete the reactions necessary to bring about the precipitation of crystalline iodine; whereas by my improved process, the proportions of the iodide and the iodate are exactly right to bring about, on acidification with a strong acid, the liberation of all of the iodine.

The object of using a glass, earthenware or wooden container is that most metals form iodides with iodine which increases the iodides above the iodates to such an extent that no crystalline iodine is precipitated from the solutions when acidified with a strong acid.

Having thus described my invention, what I claim as new and desire to secure by Letters Patent is:

1. A stable aqueous solution of calcicated iodine containing an excess of iodine capable of yielding, under the influence of a strong acid, a crystalline form of iodine.

2. A calcicated iodine comprising a composition containing iodine and a compound of calcium and iodine.

3. A stable calcicated iodine, being a composition containing an excess of iodine consisting of a mixture of approximately five parts of calcium iodide, one part of calcium iodate and an excess of iodine in solution.

4. The process of preparing calcicated iodine consisting in introducing into a container a quantity of sublimed iodine in excess of that required for reaction, adding thereto a comparatively large volume of saturated aqueous solution of calcium hydroxide, and agitating the mixture.

In witness whereof, I have hereunto set my hand.

WALLACE L. CHANDLER.